United States Patent [19]

Deuring

[11] Patent Number: 4,854,598
[45] Date of Patent: Aug. 8, 1989

[54] SLIDE RING SEAL WITH CARRIER BODY

[75] Inventor: Hans Deuring, Burscheid, Fed. Rep. of Germany

[73] Assignee: Goetze AG, Burscheid, Fed. Rep. of Germany

[21] Appl. No.: 278,474

[22] Filed: Dec. 1, 1988

[30] Foreign Application Priority Data

Dec. 1, 1987 [DE] Fed. Rep. of Germany ....... 3740694

[51] Int. Cl.$^4$ .............................................. F16J 15/38
[52] U.S. Cl. ....................................... 277/87; 277/92; 277/93 SD
[58] Field of Search .................... 277/81 R, 85, 87, 92, 277/93 R, 93 SD

[56] References Cited

U.S. PATENT DOCUMENTS

| 2,871,039 | 1/1959 | Payne | 277/87 X |
| 3,897,957 | 8/1975 | Warner | 277/85 |
| 4,502,697 | 3/1985 | Heinl | 277/81 R |
| 4,548,547 | 10/1985 | Deuring | 277/88 |

FOREIGN PATENT DOCUMENTS

| 149511 | 12/1952 | Australia | 277/81 R |
| 6944082 | 9/1973 | Fed. Rep. of Germany . | |
| 1420949 | 11/1965 | France | 277/87 |
| 56-167962 | 12/1981 | Japan | 277/92 |

Primary Examiner—Robert S. Ward
Attorney, Agent, or Firm—Spencer & Frank

[57] ABSTRACT

A slide ring seal for use in a liquid pump, for example, employs an open-ended seal housing and a carrier body which is urged away from the seal housing by a spring. A rubber ring and a slide ring are mounted in the carrier body. The slide ring slidably engages a rotating running ring on a pump impeller, for example, to form a seal. The rubber ring establishes a seal between the carrier body and the slide ring and between the carrier body and the seal housing.

6 Claims, 1 Drawing Sheet

4,854,598

SLIDE RING SEAL WITH CARRIER BODY

BACKGROUND OF THE INVENTION

The present invention relates to a slide ring seal, and more particularly to a slide ring seal of the type which includes a housing having an axially oriented and radially inwardly disposed arm, a carrier body which accommodates a slide ring, and an axially effective compression spring fixed in the housing, the spring having a free end which cooperates with the carrier body. The carrier body is sealed against the inwardly disposed arm of the housing by means of a rubber ring, and has a radially oriented arm which lies directly at the rear face of the slide ring so as to axially seal it.

U.S. Pat. No. 3,897,957 discloses a slide ring seal of the above type. A rubber ring having a C-shaped cross section is provided as a seal between the carrier body and the housing, with the radial spring force of the rubber ring being augmented by inserted spring components. The carrier body and slide ring fit snugly with one another.

During operation, such slide ring seals may be subjected to great fluctuations in temperature and to pressure differences. It may then happen that the snug fit no longer produces a satisfactory seal between the carrier body and the slide ring, so that the medium to be sealed off is able to penetrate through a gap between the components. In particular, if the slide rings are made of non-metals, such as, for example, carbon or ceramic rings, temperature fluctuations may quickly produce a leak. Because of the differences in the coefficients of thermal expansion of the components, an additional elastic seal between the components is absolutely necessary. However, the additional component makes manufacture of the slide ring seals expensive.

SUMMARY OF THE INVENTION

It is an object of the invention to ensure proper operation of a slide ring seal of the above-noted type even under great temperature fluctuations, with manufacturing costs being reduced.

This is accomplished according to the invention in that the radial arm of the carrier body lies against only part of the rear face of the slide ring, and a rubber ring lies under axial tension directly against the remaining part of the rear face of the slide ring. In this way, only one sealing element produces a reliable seal both between the carrier body and the slide ring and between the carrier body and the housing. Since the corresponding receiving faces of neither the slide ring nor the carrier body need to be worked in a cost-intensive manner, i.e., within close tolerances, simple geometric shapes and components can be employed.

According to a further idea of the invention, the rubber ring disposed between the carrier body and the slide ring has a trapezoidal cross section. In this way, the so-called "trapezoidal rubber ring" not only provides a static seal between the housing and the carrier body and between the carrier body and the slide ring, but it also generates an axial force which supports the spring force of the compression spring. The magnitude of the axial force can be varied easily and economically by way of the dimensions of the trapezoidal rubber ring. Since the rubber ring can be cut from a tube, no additional manufacturing costs are created.

To axially support the trapezoidal rubber ring, the carrier body is provided with a radially inwardly angled end region. Because of the coefficient of friction, the rubber ring which is thus clamped in between the rear face of the slide ring and the angled end region of the carrier body is able to connect the slide ring with the carrier body in a manner secure against rotation. Additionally, according to another idea of the invention, an adhesive may be employed to connect the slide ring with the carrier body. In this way, the carrier body, slide ring and rubber ring form a structural unit which can easily be installed in the housing.

DESCRIPTION OF THE PREFERRED EMBODIMENT

Figure 1:
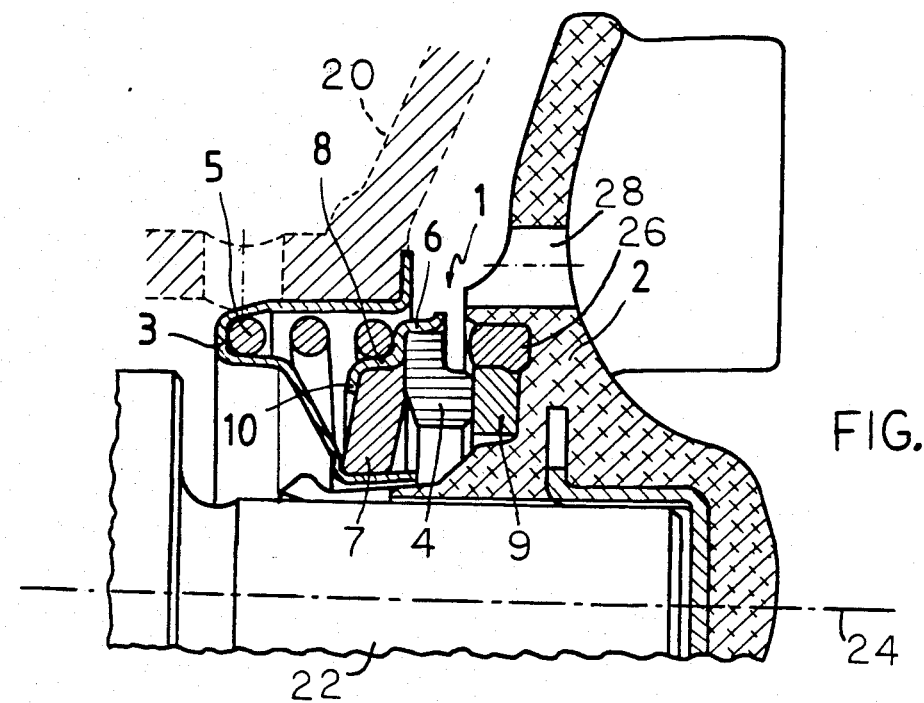
FIG. 1 is a cross sectional view showing a portion of a slide ring seal according to an embodiment of the invention, the seal being employed to seal a fluid pump.

In FIG. 1, a slide ring seal 1 in accordance with the present invention is employed as a shaft seal in a pump having an impeller 2 which is disposed within a pump casing 20. The impeller 2 is driven by a rotating pump shaft 22 having an axis 24. A running ring 9 and a centering ring 26 are affixed to impeller 2 within a recess in impeller 2. Impeller 2 may be made of a hard elastomer material and running ring 9 may be made of ceramic or sintered material. An opening 28 is provided in impeller 2 so that a tool (not illustrated) can be inserted during fabrication of the pump to press slide ring seal 1 into the pump casing 20.

Slide ring seal 1 includes a housing 3, a slide ring 4, a compression spring 5, and a carrier body 6. Housing 3 is annular, and has an axis which coincides with axis 24. Slide ring 4 is composed of synthetic resin impregnated with graphite, and slidably engages running ring 9. Slide ring 4 and a rubber ring 7, which has a trapezoidal cross section as shown, are accommodated in carrier body 6. Rubber ring 7 and carrier body 6 together form a radial support arm 8 which lies at the rear face of slide ring 4. The simple geometry of carrier body 6 permits economic manufacture, for example by deep drawing. Rubber ring 7 is axially supported (i.e., pressed outwardly in the direction of axis 24) by a radially inwardly angled end region 10 of carrier body 6 and lies under axial tension (i.e., compressed in the direction of axis 24) between the end region 10 and the rear face of slide ring 4. Rubber ring 7 provides a static seal with respect to slide ring 4 and housing 3. At the same time, however, the spring force of compression spring 5 is able to be transferred directly to slide ring 4, i.e., without the intermediary of elastomer components.

Additionally, the friction heat between slide ring 4 and running ring 9 can easily be dissipated.

Since rubber ring 7 lies under axial tension at the rear face of slide ring 4, no mechanical means for securing it against rotation are required. The friction between slide ring 4 and rubber ring 7 is sufficient to reliably hold slide ring 4 within carrier body 6. Because of this structure, carrier body 6 and slide ring 4 can be manufactured with broad dimensional tolerances, and a snug fit is not necessary.

Figure 2:
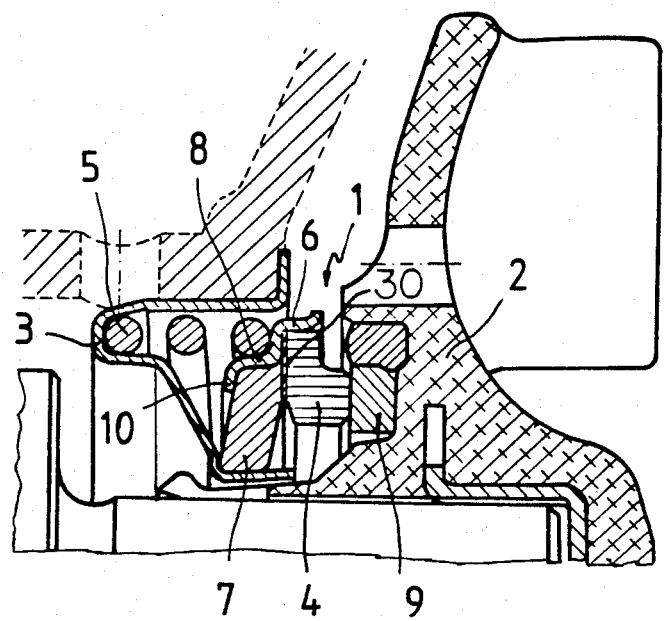
FIG. 2 is a cross sectional view showing a portion of a slide ring seal according to a modified embodiment, the seal again being employed in a pump.

Depending on the type of slide ring material which is employed, as shown in FIG. 2 an adhesive layer 30 may be applied, in addition to the security against rotation provided by friction, between the rear face of slide ring 4 and the radial support arm 8. Adhesive layer 30 increases the security against rotation, and also combines slide ring 4, rubber ring 7, and carrier body 6 into a structural unit which can then be easily installed in housing 3.

It will be understood that the above description of the present invention is susceptible to various modifications, changes, and adaptations, and the same are intended to be comprehended within the meaning and range of equivalents of the appended claims.

What is claimed is:

1. A slide ring seal, comprising:
    an annular housing having an axis, the housing including an axially oriented and radially inwardly disposed arm;
    a carrier body having a radially oriented arm portion;
    a compression spring in the housing, the spring urging the carrier body in the axial direction;
    a slide ring having a rear face with first and second portions, the radially oriented arm portion of the carrier body lying directly at the first portion of the rear face of the slide ring so as to axially support the slide ring; and
    an elastomer ring having a portion which is sealed against the inwardly disposed arm of the housing, the elastomer ring having another portion which lies under axial tension directly at the second portion of the rear face of the slide ring.

2. The slide ring seal of claim 1, wherein the elastomer ring has a trapezoidal cross section.

3. The slide ring seal of claim 1, wherein the carrier body additionally has a radially inwardly angled end portion which is connected to the radially oriented portion, the radially inwardly angled end portion axially supporting the elastomer ring.

4. The slide ring seal of claim 1, wherein the slide ring is connected to the carrier body so that the slide ring is secure against rotation with respect to the carrier body.

5. The slide ring seal of claim 1, further comprising adhesive connecting the slide ring to the carrier body.

6. The slide ring seal of claim 1, wherein the elastomer ring is a rubber ring and wherein the compression spring is fixed in the housing.

* * * * *